United States Patent
Xie et al.

(10) Patent No.: US 11,601,164 B2
(45) Date of Patent: Mar. 7, 2023

(54) CONTACTLESS CONNECTOR, SIGNAL PROCESSING METHOD AND STORAGE MEDIUM

(71) Applicant: Institute of Geology and Geophysics, Chinese Academy of Sciences, Beijing (CN)

(72) Inventors: Qijun Xie, Beijing (CN); Yongyou Yang, Beijing (CN); Qingbo Liu, Beijing (CN); Qingyun Di, Beijing (CN); Linfeng Hong, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/257,483

(22) PCT Filed: May 28, 2020

(86) PCT No.: PCT/CN2020/092887
§ 371 (c)(1),
(2) Date: Dec. 31, 2020

(87) PCT Pub. No.: WO2021/208205
PCT Pub. Date: Oct. 21, 2021

(65) Prior Publication Data
US 2023/0023129 A1    Jan. 26, 2023

(30) Foreign Application Priority Data

Apr. 17, 2020  (CN) .......................... 202010307544.8

(51) Int. Cl.
*H04B 5/00* (2006.01)
*H04B 1/38* (2015.01)
(Continued)

(52) U.S. Cl.
CPC ......... *H04B 5/0081* (2013.01); *H04B 5/0031* (2013.01)

(58) Field of Classification Search
None
See application file for complete search history.

(56) References Cited

U.S. PATENT DOCUMENTS 5,412,253 A * 5/1995 Hough ................ G06F 13/4068
336/200
6,476,520 B1 * 11/2002 Bohm .................... H02H 9/008
340/538.17
(Continued)

FOREIGN PATENT DOCUMENTS

CN  104756411 A  7/2015
CN  105230036 A  1/2016
(Continued)

OTHER PUBLICATIONS

First Chinese Office Action Application No. 202010307544.8; dated Sep. 25, 2020; p. 11.
(Continued)

*Primary Examiner* — Tuan A Tran
(74) *Attorney, Agent, or Firm* — Cantor Colburn LLP

(57) ABSTRACT

Disclosed is a contactless connector, a signal processing method and a storage medium. The contactless connector can be in communication connection to a plug matched with the contactless connector. The plug is provided with a second magnetic core and a second coil, and the second coil is spirally arranged at the periphery of the second magnetic core and forms a secondary coil with the second magnetic core. The contactless connector includes: at least two plug interfaces, each of the plug interfaces including a first magnetic core; and a first coil, spirally arranged at an inner periphery of the first magnetic core of each of the plug interfaces and forming a main coil with the first magnetic
(Continued)

core. When the contactless connector and a plurality of plugs are connected through at least two plug interfaces, the main coil and the secondary coil are electromagnetically coupled to realize communication connection between the contactless connector and the plurality of plugs. According to the present application, it can be achieved that the wiring difficulty between devices may be reduced while the service life of the connector is ensured.

16 Claims, 7 Drawing Sheets

(51) Int. Cl.
*H04B 1/48* (2006.01)
*H02J 50/10* (2016.01)
*H01F 38/14* (2006.01)

(56) References Cited

U.S. PATENT DOCUMENTS

| | | | | |
|---|---|---|---|---|
| 6,950,633 | B2* | 9/2005 | Kojima | H01F 38/18 343/702 |
| 7,331,793 | B2* | 2/2008 | Hernandez | H01F 38/14 439/38 |
| 7,663,462 | B2* | 2/2010 | Makuth | H01F 38/18 336/130 |
| 9,466,420 | B2* | 10/2016 | Van Gils | H04B 5/0075 |
| 9,634,439 | B2* | 4/2017 | Riezebos | H04B 5/0037 |
| 9,667,323 | B2* | 5/2017 | Habraken | H04B 5/0031 |
| 9,761,372 | B2* | 9/2017 | Habraken | H01F 27/24 |
| 9,825,673 | B2* | 11/2017 | Riezebos | H04B 5/0075 |
| 9,876,266 | B2* | 1/2018 | Abramov | H02J 50/30 |
| 9,878,628 | B2* | 1/2018 | Tsukamoto | H02J 50/10 |
| 9,953,762 | B2* | 4/2018 | Van Gils | H04B 5/0093 |
| 10,141,104 | B2* | 11/2018 | Habraken | H01F 38/14 |
| 10,269,487 | B2* | 4/2019 | Kumura | H04B 5/0037 |
| 10,483,797 | B2* | 11/2019 | Habraken | H02J 50/80 |
| 10,560,157 | B2* | 2/2020 | Yukimasa | H01Q 1/48 |
| 2007/0141887 | A1* | 6/2007 | Kuo | H01F 38/14 439/281 |
| 2012/0268886 | A1* | 10/2012 | Leontiev | G06K 19/07749 361/679.31 |
| 2013/0002039 | A1* | 1/2013 | Kusamitsu | H04B 5/0012 307/104 |
| 2013/0109317 | A1* | 5/2013 | Kikuchi | H01P 5/087 455/41.2 |
| 2016/0006485 | A1* | 1/2016 | Habraken | H04B 5/0093 333/24 C |

FOREIGN PATENT DOCUMENTS

| | | | |
|---|---|---|---|
| CN | 206516058 | U | 9/2017 |
| CN | 107924377 | A | 4/2018 |
| CN | 110086506 | A | 8/2019 |
| CN | 210327156 | A | 4/2020 |
| EP | 2614980 | * 7/2013 | ............ B60L 11/18 |
| JP | H0714730 | A | 1/1995 |
| JP | H10112415 | A | 4/1998 |

OTHER PUBLICATIONS

Chinese Notice of Allowance Application No. 202010307544.8; dated Nov. 17, 2020; p. 4.

* cited by examiner

CONTACTLESS CONNECTOR, SIGNAL PROCESSING METHOD AND STORAGE MEDIUM

CROSS-REFERENCE TO RELATED APPLICATIONS

This application is a National Phase of PCT Application No. PCT/CN2020/092887 filed May 28, 2020 which claims priority to Chinese Application No. 202010307544.8 filed on Apr. 17, 2020, entitled "CONTACTLESS CONNECTOR, SIGNAL PROCESSING METHOD AND STORAGE MEDIUM", which is incorporated herein by reference in its entirety.

TECHNICAL FIELD

The invention related to the technical field of connectors and particularly relates to a contactless connector, a signal processing method and a storage medium.

BACKGROUND

With the development of science and technology, the wired communication technology is widely applied in various fields. For example, in the field of the automatic control technology, data communication between devices usually adopts the wired communication technology. Generally, one device may be connected to a plurality of devices through different interfaces. For example, when the device A communicates with the plurality of devices, the usual way is that each device is connected to the device A through one connector.

In this way, when there are more devices communicating with the device A, the wiring difficulties and the maintenance costs will be increased, and the plugging and unplugging times of the connector for performing wired transmission on signals are limited, that is, the service life is limited; and if the connector is plugged and unplugged for many times, the error rate of the connector during signal transmission will be increased. Furthermore, in some special environments, such as the seabed, deserts or mines, when the master device on the ground communicates with multiple slave devices underground, the wired communication connector and the plug connecting port have high sealing requirements, for example, high waterproof and dustproof properties are required, so that it is more necessary to avoid plugging and unplugging action on the connector to ensure the sealing property and the communication accuracy of the connector.

Although there are some wireless communication connectors in the prior art, communication between the plug and the socket is realized usually on the basis of wireless transmission modules such as RF, infrared and the like. These wireless communication connectors are generally suitable for application scenarios with better environments. When under water or in obstructed complex terrain, due to factors such as difficulty in receiving optical signals by the connector or the plug, large environmental interference and the like, the transmission distance of the wireless communication connectors is limited, the signal transmission is unstable, and the communication requirements between devices in special environments cannot be met.

SUMMARY

For the above defects, the invention provides a contactless connector, a signal processing method and a storage medium. The contactless connector of the present application can reduce the wiring difficulty between devices while ensuring the service life of the connector.

The invention is implemented by the following technical solutions:

According to a first aspect, the embodiment of the invention provides a contactless connector. The contactless connector can be in communication connection to a plug matched with the contactless connector. The plug is provided with a second magnetic core and a second coil, and the second coil is spirally arranged at the periphery of the second magnetic core and forms a secondary coil with the second magnetic core. The contactless connector includes: at least two plug interfaces, each of the plug interfaces includes a first magnetic core; and a first coil, spirally arranged at an inner periphery of the first magnetic core of each of the plug interfaces and forming a main coil with the first magnetic core. When the contactless connector and a plurality of plugs are connected through at least two plug interfaces, the main coil and the secondary coil are electromagnetically coupled to realize communication connection between the contactless connector and the plurality of plugs.

In an optional implementation manner, the contactless connector further includes a signal processing circuit. The signal processing circuit includes a cable, a port processing unit and a signal processing unit, wherein the cable, one end of which can be connected to a first terminal device and the other end can be connected to the port processing unit, is configured to receive a signal transmitted by the first terminal device and/or transmit a signal to the first terminal device; the port processing unit, one end of which is connected to the cable and the other end is connected to the signal processing unit, is configured to acquire a data communication transmission mode of a port of the first terminal device and perform interface configuration on the cable according to the data communication transmission mode; and the signal processing unit, which is connected to the main coil, is configured to, if receiving the signal transmitted by the first terminal device, transmit the signal to the main coil, and/or is configured to, if receiving the signal transmitted by the main coil, transmit the signal to the first terminal device according to the data communication transmission mode.

In a preferred implementation manner, the signal processing unit is further configured to, if receiving the signal transmitted by the first terminal device, determine a signal propagation mode and device information of a second terminal device to receive a signal according to the signal and transmit the signal to the main coil according to the signal propagation mode and the device information, wherein the signal propagation mode is an unicast mode or a broadcast mode, and the second terminal device is connected to the contactless connector by the plug.

In a preferred implementation manner, the signal processing unit determines the signal propagation mode according to a propagation mode flag of the signal and determines the device information according to a second terminal device flat bit of the signal or device information corresponding to the previous signal.

In a preferred implementation manner, the signal processing unit includes a carrier modulator; one end of the carrier modulator is connected to the port processing unit and the other end of the carrier modulator is connected to the main coil; the carrier modulator is configured to, if the signal propagation mode is a unicast mode, modulate the signal into a frequency band signal matched with the device information and transmit the frequency band signal to the main coil; and/or the carrier modulator is configure to, if the signal propagation mode is a broadcast mode, modulate the signal into frequency band signals respectively matched with multiple pieces of device information and transmit the frequency band signals to the main coil.

In a preferred implementation manner, the signal processing unit further includes a plurality of groups of band pass filters and carrier demodulators; the number of the band pass filters and the carrier demodulators is matched with the number of the plug interfaces of the contactless connector; the band pass filters, input ends of which are connected to the main coil, are configured to receive the signal transmitted by the main coil; and the carrier demodulators, input ends of which are connected to output ends of the band pass filters, are configured to receive signals output by the band pass filters and demodulate the signals into digital signals.

In a preferred implementation manner, one of the plug interfaces of the contactless connector and the plug matched with the plug interface is provided with a connecting piece, and the other one is provided with a matching piece; and the matching piece is matched with the connecting piece to realize connection between the plug and the contactless connector.

According to a second aspect, the embodiment of the invention provides a signal processing method, applied to the first aspect or the contactless connector in any one of implementation manners of the first aspect. The method includes: if receiving the signal transmitted by the first terminal device connected to the contactless connector, determining a signal propagation mode of the signal and device information of a second terminal device to receive the signal, wherein the second terminal device is connected to the contactless connector through the plug; and transmitting the signal to the main coil according to the signal propagation mode and the device information, wherein the signal propagation mode is a unicast mode or a broadcast mode.

In a preferred implementation manner, the determining a signal propagation mode of the signal and device information of a second terminal device to receive a signal specifically includes: determining the signal propagation mode according to a propagation mode flag of the signal; and determining the device information according to a second terminal device flat bit of the signal or device information corresponding to the previous signal.

In a preferred implementation manner, the transmitting the signal to the main coil according to the signal propagation mode and the device information specifically includes:

if the signal propagation mode is a unicast mode, modulating the signal into a frequency band signal matched with the device information and transmitting the frequency band signal to the main coil; and/or if the signal propagation mode is a broadcast mode, modulating the signal into frequency band signals respectively matched with multiple pieces of the device information and transmitting the frequency band signals to the main coil.

In a preferred implementation manner, the determining the device information according to a second terminal device flat bit of the signal or device information corresponding to the previous signal specifically includes: determining whether the device information is changed according to a state flag of the signal; if the device information is changed, determining the device information according to the second terminal device flat bit of the signal; and if the device information is not changed, taking the device information corresponding to the previous signal as device information corresponding to the current signal.

In a preferred implementation manner, the method further includes: acquiring a data communication transmission mode of a port of the first terminal device; performing interface configuration on the contactless connector according to the data communication transmission mode; and if receiving the signal transmitted by the main coil, transmitting the signal to the first terminal device according to the data communication transmission mode.

According to a third aspect, the embodiment of the invention provides a signal processing method, applied to the first terminal device. The first terminal device can be in communication connection to a second terminal device through a contactless connector and a plug. The method includes: acquiring device information of the second terminal device to receive a signal, wherein the first terminal device is configured to transmit a signal to the second terminal device; determining a signal propagation mode matched with the device information; and setting a signal format of the signal according to the device information and the signal propagation mode.

In a preferred implementation manner, the signal format includes a propagation mode flag and a second terminal device flag. The method further includes: determining a bit number of the second terminal device flat bit according to the number of the second terminal device.

In a preferred implementation manner, the signal format further includes a state flag. The method further includes: updating the state flat bit in response to a change of the device information.

According to a fourth aspect, the embodiment of the invention provides a computer readable storage medium, storing a computer program, wherein the program, when being executed by a processor, enables the processor to perform the signal processing method according to the second aspect or any one of implementation manners of the second aspect, or the signal processing method according to the third aspect or any one of implementation manners of the third aspect.

The technical solutions of the present application can bring the following beneficial effects:

1. the contactless connector of the present application is provided with at least two plug interfaces and can be connected to a plurality of devices through the plug interfaces and plugs matched with the plug interfaces. In special environments such as underwater, desert and the like where there are multiple devices needing to be controlled, the contactless connector of the present application may realize communication between one and multiple devices, thus reducing wiring difficulties and maintenance costs. Furthermore, the contactless connector and the plug are in communication connection through electromagnetic coupling between the main coil and the secondary coil. An electromagnetic coupling transmission signal is a wireless transmission signal. Compared with the wired transmission and wireless transmission modes in the prior art, electromagnetic coupling communication is less interfered by the external environment when the signal is received, and physical plugging and unplugging have little influence on the communication of the contactless connector. Therefore, the contactless connector of the present application has long service life and can have high communication reliability in the special environments such as underwater, desert and the like.

2. According to the signal processing method of the present application, the signal can be transmitted to the main coil according to the signal propagation mode of the signal and the device information of the second terminal device to receive a signal, that is, information of a signal receiving end (the second terminal device) is automatically identified and the signal is transmitted to the main coil according to the information, thus facilitating information matching between the signal and the second terminal device, realizing signal transmission between one and multiple devices, avoiding signal transmission error and improving communication efficiency.

3. According to the signal processing method of the present application, the signal format of the signal can be set according to the device information of the second terminal device and the signal propagation mode matched with the device information, so that when a signal is transmitted to the contactless connector at each time, the signal received by the contactless connector is a signal with the signal format, and the contactless connector may learn the signal propagation mode of the signal and the device information of the second terminal device. It can be seen that the setting of the signal format makes the destination and the propagation mode of the signal in the transmission process clear and specific, so that during communication between one and multiple devices, different signals or the same signal may be transmitted between one and multiple devices at the same time, thereby avoiding communication error while improving signal transmission efficiency.

REFERENCE NUMERALS

1—contactless connector, 11—first shell, 12—first magnetic shielding layer, 13—first coil, 14—first magnetic core, 15—first electronic cabin, 16—first cable, 17—connecting piece, 18—signal processing circuit A, 181—port processing unit, 182—signal processing unit, 1821—carrier modulator A, 1822—amplifier A, 183—microprocessor A, 19—main coil;

2—plug, 21—second shell, 22—matching piece, 23—second magnetic core, 24—second magnetic shielding layer, 25—second coil, 26—second electronic cabin, 27—second cable, 28—signal processing circuit B, 281—band pass filter B, 282—filter demodulator B, 283—microprocessor B, 284—carrier modulator B, 285—amplifier B, 29—secondary coil;

3—first terminal equipment;

4—second terminal equipment B; and

5—second terminal equipment C.

DESCRIPTION OF EMBODIMENTS

In order to make the objectives, technical solutions and advantages of the embodiments of the invention clearer, the technical solutions in the embodiments of the invention are described below clearly and completely with reference to the accompanying drawings in the embodiments of the invention. Apparently, the described embodiments are some rather than all of the embodiments. All other embodiments obtained by those skilled in the art based on the embodiments of the invention without creative efforts shall fall within the protection scope of the invention.

Embodiment I

The embodiment of the invention provides a contactless connector. The contactless connector can be in communication connection to a plug matched with the contactless connector. The plug is provided with a second magnetic core and a second coil, wherein the second coil is spirally arranged at the periphery of the second magnetic core and forms a secondary coil with the second magnetic core.

The contactless connector includes at least two plug interfaces. Each of the plug interfaces includes a first magnetic core and a first coil. The first coil is spirally arranged at the periphery of the first magnetic core of each of the plug interfaces and forms a main coil with the first magnetic core.

Figure 1:
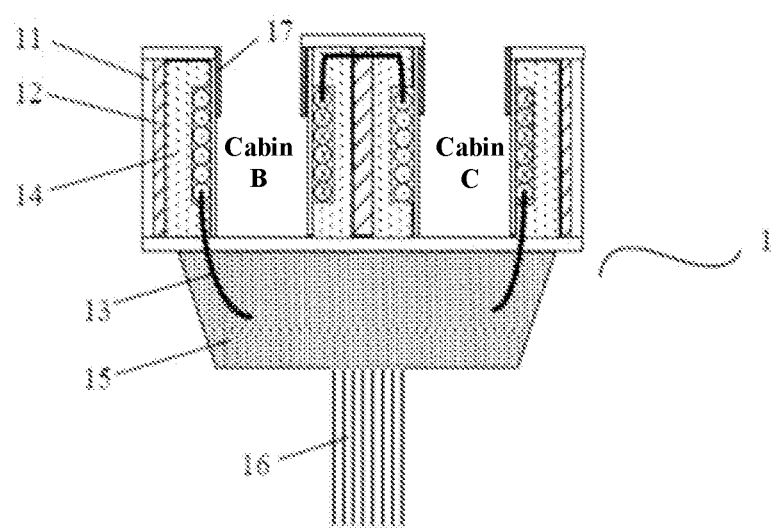
FIG. 1 shows a schematic front view of a contactless connector according to an embodiment of the present application.
Figure 2:
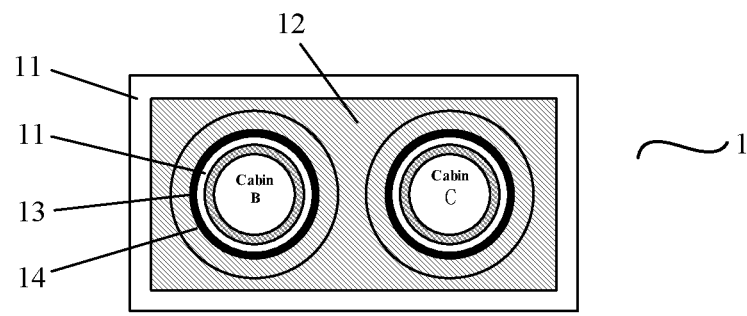
FIG. 2 shows a schematic top view of a contactless connector according to an embodiment of the present application.

Specifically, as shown in FIG. 1 and FIG. 2, the contactless connector 1 of the embodiment includes a first shell 11, a first magnetic shielding layer 12, a first coil 13, a first magnetic core 14, a first electronic cabin 15, a first cable 16 and a connecting piece 17.

The contactless connector 1 herein may be understood as a socket. The socket is provided with two plug interfaces. Of course, the contactless connector 1 of the present application may have a plurality of plug interfaces, for example, three plug interfaces, four plug interfaces and the like, which are not limited in the embodiment. As shown in FIG. 1, each of plug interfaces has a part of the first coil 13 and the first magnetic core 14. The first coil 13 and the first magnetic cores 14 form a main coil 19. The main coil 19 is, for example, a ferrite coil. In the socket, no matter how many plug interfaces there are, the first coil 13 is a continuous litz wire passing through each plug interface, and it may be also understood that the first coils 13 of the plug interfaces are connected in series; therefore, in the contactless connector 1, a signal transmitted by a master device may be transmitted to each plug interface through the contactless connector 1 and then transmitted to corresponding connected slave devices through each plug interface.

The first shell 11 is mainly configured to protect ferrite coils which are formed by the first coils 13 and the first magnetic core 14 and are connected in series in the contactless connector 1. The magnetic shielding layer 12 is arranged around the main coil 19. It can be seen from FIG. 1 that suppose two plug interfaces are a cabin B and a cabin C, the first magnetic shielding layer 12 is arranged around the ferrite coil of the cabin B, and the first magnetic shielding layer 12 is also arranged around the ferrite coil of the cabin C. The objective of the arrangement is to shield magnetic interference on the ferrite coil by the external environment connected to the contactless connector 1 and shield magnetic interference between the ferrite coils of the cabin B and the cabin C, thus ensuring the accuracy of signal transmission. It should be noted that the ferrite coils of these plug interfaces of the contactless connector 1 uniformly form the main coil 19.

The first coil 13 is a litz wire, which starts from the first electronic cabin 15 of the contactless connector 1, goes around the first magnetic core 14 of the cabin B by several circles, passes through the first magnetic shielding layer 12 between the cabin B and the cabin C, continuously goes around the first magnetic core 14 of the cabin C in a winding direction opposite to that of the cabin B by several circles to form the ferrite coils connected in series and finally returns to the first electronic cabin 15 from the cabin C. Due to the simple winding mode, the ferrite coils between the two plug interfaces of the cabin B and the cabin C are connected in series, only one litz wire is required in the contactless connector 1, and the same signal may be transmitted to a plug side at the same time during signal transmission.

The first magnetic core 14 is, for example, a ferrite magnetic core, and may be made of a PC95 material. A shape of the first magnetic core 14 is matched with that of the plug interface, for example, if the cabin B and the cabin C are cylindrical, the first magnetic cores 14 corresponding to the cabin B and the cabin C may be of ring-shaped structures wrapping the cabin B and the cabin C. The first magnetic cores 14 in the cabin B and the cabin C and the first coils wound on the first magnetic cores 14 jointly form two magnetic coupling coils which are connected in series. Since the winding directions of the two magnetic coupling coils are opposite, the magnetic shielding layer may be combined when the contactless connector 1 is electrified, thereby further reducing magnetic interference between the magnetic coupling coils in the two plug interfaces and improving the reliability of signal transmission.

The first electronic cabin 15 may be configured to place a signal processing circuit of the contactless connector 1.

The first cable 16 includes four leads. The first electronic cabin 15 connected to the contactless connector 1 may connect the master device in the one-to-multiple devices to other processing units in the signal processing circuit.

The connecting piece 17 is arranged on the contactless connector 1, and the matching piece 22 is arranged on the plug matched with the contactless connector 1. The connecting piece 17 may be of a buckling structure or a threaded structure, accordingly, the plug is correspondingly provided with a clamping opening or a threaded structure (matching piece 22); therefore, when the corresponding plugs are plugged or screwed into the plug interfaces of the contactless connector 1, the two plugs can be respectively connected to the two plug interfaces of the contactless connector 1 to fasten the contactless connector 1 and the plugs.

It should be noted that the connecting piece 17 may further be arranged on the plug, and the matched piece 22 is correspondingly arranged on the plug interface of the contactless connector 1, which is not limited in this embodiment.

Figure 3:
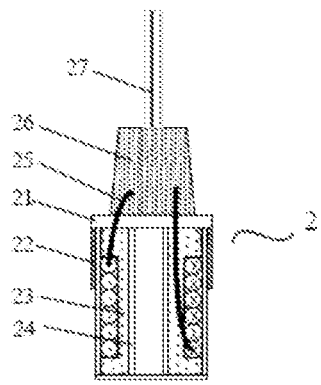
FIG. 3 shows a schematic front view of a plug according to an embodiment of the present application.
Figure 4:
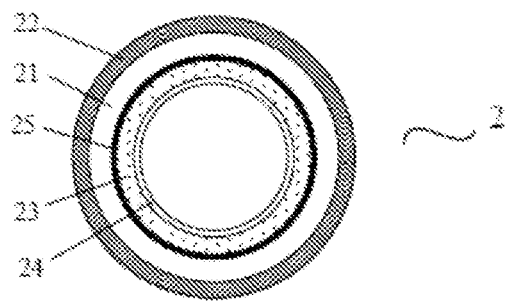
FIG. 4 shows a schematic bottom view of a plug according to an embodiment of the present application.

To better illustrate the present application, the embodiment further provides a structural schematic diagram of the plug. As shown in FIG. 3 and FIG. 4, the plug 2 is matched with the plug interface. If the above plug interface is of a cylindrical structure, the plug 2 is also of a cylindrical structure. Of course, the plug interface may be of a cuboid structure, the plug 2 is of a cuboid structure correspondingly, which is not limited in this embodiment.

The plug 2 may include a second shell 21, a matching piece 22, a second magnetic core 23, a second magnetic shielding layer 24, a second coil 25, a second electronic cabin 26 and a second cable 27.

The second shell 21 is mainly configured to protect ferrite coils which are formed by the second coil 25 and the second magnetic core 23 in the plug 2. The second magnetic core 23 may be a ferrite magnetic core, and for example, may be made of a PC95 material. The second coil 25 is a litz wire, which starts from the second electronic cabin 26 of the plug 2, goes around the second magnetic core 23 by several circles and then is connected to the second electronic cabin 26. The second coil 25 and the second magnetic core 23 forms a ferrite coil, which may be referred to as a secondary coil 29.

A circuit board of the plug 2 may be arranged in the second electronic cabin 26, and a signal processing circuit of the plug 2 is arranged on the circuit board.

The second cable 27 generally includes four leads, which may connect the slave devices in the one-to-multiple devices to other processing units in the signal processing circuit of the plug.

In a preferred implementation manner of the embodiment, the contactless connector 1 further includes a signal processing circuit. The signal processing circuit includes a cable, a port processing unit and a signal processing unit. The cable herein is the above first cable.

Figure 5:
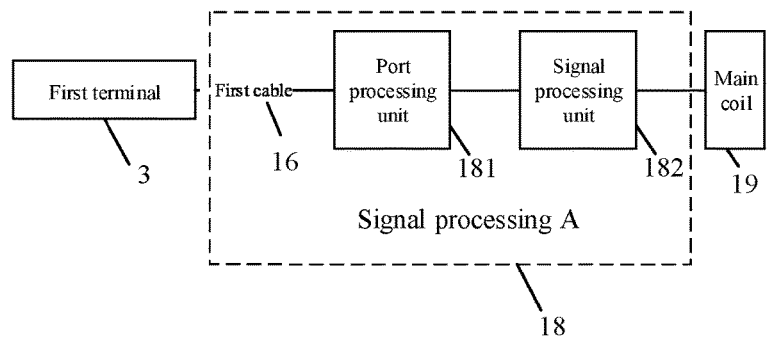
FIG. 5 shows a circuit block diagram of a contactless connector according to an embodiment of the present application.

FIG. 5 shows a structural schematic diagram of a circuit of the contactless connector 1. The contactless connector 1 includes a signal processing circuit A18.

The signal processing circuit A18 includes a cable, a port processing unit 181 and a signal processing unit 182. Here, for the convenience of distinguishment, the cable of the contactless connector is denoted as a first cable 16. One end of the first cable 16 can be connected to the first terminal device 3, and the other end of the first cable 16 can be connected to the port processing unit 181. The first cable 16 is configured to receive a signal transmitted by the first terminal device 3, and/or transmit a signal to the first terminal device 3.

One end of the port processing unit 181 is connected to the first cable 16, and the other end of the port processing unit 181 is connected to the signal processing unit 182. The port processing unit 181 is configured to acquire a data communication transmission mode of a port of the first terminal device 3 and perform interface configuration on the first cable 16 according to the data communication transmission mode.

Specifically, when transmitting a signal between the devices, the contactless connector in the prior art can only be suitable for a communication protocol, for example, if the port of the device is a certain protocol, the contactless connector must be a protocol matched with the port of the device before transmitting the signal; therefore, the existing contactless connector is generally that one connector corresponds to one communication protocol, and the contactless connector has poor universality.

According to the contactless connector 1 in the implementation manner, the data communication transmission mode of the port of the first terminal device 3 may be transmission protocols such as URAT, IIC, SPI, CAN and the like. The port processing unit 181 may configure four leads of the first cable 16 according to the data communication transmission mode of the port. For example, when the data communication transmission mode is URAT, three of the four leads are respectively configured as TX, RX and GND, and the remaining one is idle; when the data communication transmission mode is IIC, two of the four leads are respectively configured as SCL and SDA, and the remaining two leads are idle; when the data communication transmission mode is SPI, the four leads are respectively configured as CS, SCK, MISO and MOSI; and when the data communication transmission mode is CAN, three of the four leads are respectively configured as CAN_H, CAN_L and GND, and the remaining one is idle.

In this way, the interface configuration of the contactless connector 1 may be adjusted according to the data communication transmission mode of the port of the first terminal device 3, so that the contactless connector 1 can be flexibly suitable for different data communication transmission modes and has high universality.

The signal processing unit 18, which is connected to the main coil 19, is configured to, if receiving the signal transmitted by the first terminal device 3, transmit the signal to the main coil 19, and/or is configured to, if receiving the signal transmitted by the main coil 19, transmit the signal to the first terminal device 3 according to the data communication transmission mode, thereby realizing signal transmission between a terminal device on the plug side and the first terminal device 3.

Figure 6:
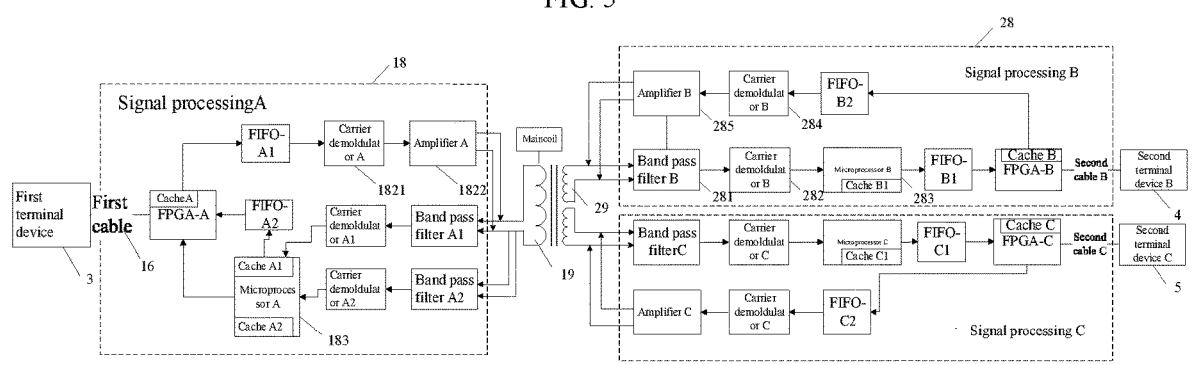
FIG. 6 shows a circuit principle schematic diagram of connection between a contactless connector and a plug according to an embodiment of the present application.

In a preferred implementation manner of the embodiment, FIG. 6 shows a circuit principle schematic diagram of connection between the contactless connector 1 and the plug 2. The signal processing circuits in the contactless connector 1, the plug B and the plug C are respectively denoted as a signal processing circuit A18, a signal processing circuit B28 and a signal processing circuit C.

The signal processing circuit A18 includes a first cable 16, a microprocessor A183, FPGA-A, FIFO-A1, a carrier modulator A1821, an amplifier A1822, FIFO-A2, a carrier demodulator A1, a band pass filter A1, a carrier demodulator A2 and a band pass filter A2.

Specifically, it may be understood that the microprocessor A183 can control the signal processing unit 182. The signal processing unit may include, but is not limited to, the above carrier modulator A1821, amplifier A1822, carrier demodulator A1, band pass filter A1, carrier demodulator A2 and band pass filter A2. The port processing unit includes, but is not limited to, the above FPGA-A.

The signal processing circuit B28 includes, but is not limited to, a band pass filter B281, a carrier demodulator B282, a microprocessor B283, FIFO-B1, FPGA-B, FIFO-B2, a carrier modulator B284, an amplifier B285 and a second cable B.

A circuit structure of the signal processing circuit C is similar to that of the signal processing circuit B, which will be not elaborated here.

The first terminal device 3 is connected to the contactless connector 1. One end of the plug B and one end of the plug C are connected to the contactless connector 1, and the other end of the plug B and the other end of the plug C are connected to the second terminal device B4 and the second terminal device C5.

Figure 7:
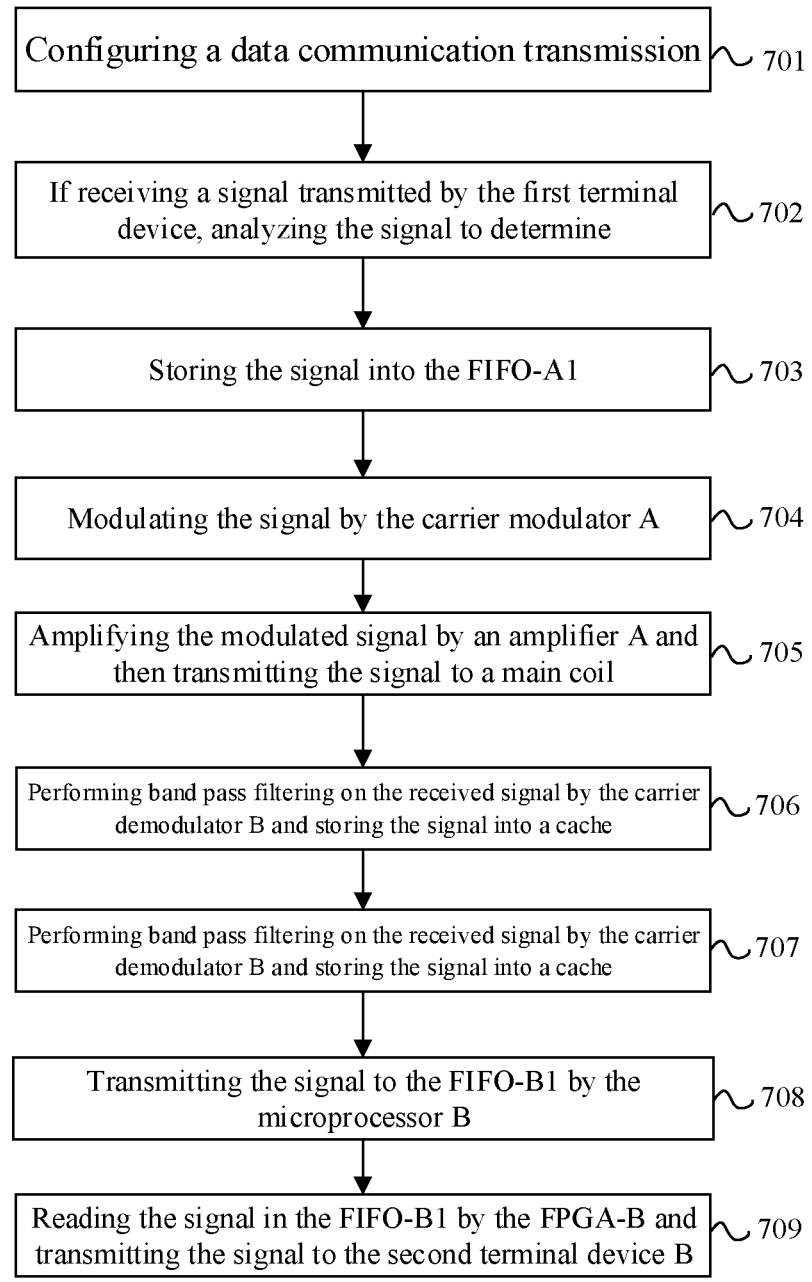
FIG. 7 shows a schematic diagram of signal transmission of a contactless connector according to an embodiment of the present application.

Specifically, if a signal is transmitted from the first terminal device 3 to the second terminal device B4 and the second terminal device C5, the signal transmission process of the contactless connector of the implementation manner is as shown in FIG. 7 by combining with the above circuit principle diagram.

Step 701: a data communication transmission mode is configured.

When the contactless connector 1 is connected to the first terminal device 3, the microprocessor A183 may control the FPGA-A to configure the first cable 16 as a data communication transmission mode matched with the port of the first terminal device 3. Here, illustration is conducted by taking the case where the data communication transmission mode is URAT as an example. The FPGA-A may respectively configure three of the four leads of the first cable 16 as TX, RX and GND, and the remaining one is idle.

In a similar way, when the plug B and the plug C are respectively connected to the second terminal device B4 and the second terminal device C5, the microprocessor B283 may control the FPGA-B to configure the second cable B as a data communication transmission mode matched with a port of the second terminal device B4, and the microprocessor C may control the FPGA-C to configure a second cable C as a data communication transmission mode matched with a port of the second terminal device C5.

Step 702: if a signal transmitted by the first terminal device is received, the signal is analyzed to determine a signal propagation mode and device information.

Specifically, the microprocessor A183 may analyze the signal received from the first terminal device 3 to acquire the signal propagation mode and the device information. As an example, in the first terminal device 3, the last bit of the signal may be represented as a signal propagation flag, suppose it is necessary for the first terminal device 3 to transmit the same signal to the second terminal device B4 and the second terminal device C5 at the same time, the last bit of the signal may be 1, representing a broadcast mode.

As another example, suppose it is necessary for the first terminal device 3 to transmit the signal to the second terminal device B4 and it is unnecessary to transmit the signal to the second terminal device C5, the last bit of the signal is 0, representing a unicast mode. Then, the last third bit of the signal may be set to represent device information of the terminal device to receive a signal, for example, 0 may represent the second terminal device B4 and 1 may represent the second terminal device C5. If it is necessary to transmit the signal to the second terminal device B4, the last third bit of the signal is displayed as 0.

Step 703: the signal is stored into the FIFO-A1.

Suppose the signal propagation flag of the signal is 1 after the microprocessor A183 analyzes the signal, it indicates that the signal needs to be transmitted to the second terminal device B4 and the second terminal device C5 at the same time. At this time, the microprocessor A183 may respectively store the signal into two channels in the FIFO-A1, namely a channel B and a channel C. When the number of the second terminal devices receiving the signal increases, the number of the storage channels in the FIFO-A1 increases accordingly.

Step 704: the signal is modulated by the carrier modulator A.

Specifically, the microprocessor A183 may determine whether the channel B and the channel C in the FIFO-A1 are empty. If the channel B and the channel C in the FIFO-A1 are empty, it is necessary to wait for the signal stored in the FIFO-A1 before transmission; and if the channel B and the channel C in the FIFO-A1 are not empty, the FIFO-A1 respectively transmit the signals in the channel B and the channel B to the carrier modulator A1821, and the carrier modulator A1821 modulates the signal in the channel B into a fa1-fa2 frequency band and modulates the signal in the channel C into a fa3-fa4 frequency band, wherein the fa1-fa2 frequency band fa3-fa4 frequency band do not overlap.

Step 705: the modulated signal is amplified by an amplifier A and then is transmitted to a main coil.

Step 706: the band pass filter B receives a signal on a secondary coil B and transmits the signal to a filter demodulator B.

Step 707: the carrier demodulator B performs band pass filtering on the received signal and stores the signal into a cache B1.

Specifically, a filtering frequency band of the carrier demodulator B282 is fa1-fa2, the signal on the fa1-fa2 frequency band is demodulated to obtain a digital signal, and then the digital signal is transmitted to the cache B1 for storage.

Step 708: the microprocessor B transmits the signal to the FIFO-B1.

Specifically, the microprocessor B283 analyzes, packages and writes the digital signal into the FIFO-B1.

Step 709: the FPGA-B reads the signal in the FIFO-B1 and transmits the signal to the second terminal device B.

Specifically, the microprocessor B283 may determine whether the FIFO-B1 is empty, if the FIFO-B1 is empty, it is necessary to wait for the signal in the FIFO-B1 before signal transmission; and if the FIFO-B1 is not empty, the FPGA reads the signal in the FIFO-B1 and transmits the signal to the second cable B in a data communication transmission mode matched with the second terminal device B4, and the second cable B transmits the signal to the second terminal device B4.

The process of transmitting a signal to the second terminal device C is similar to the above process, which will be not elaborated here.

Figure 8:
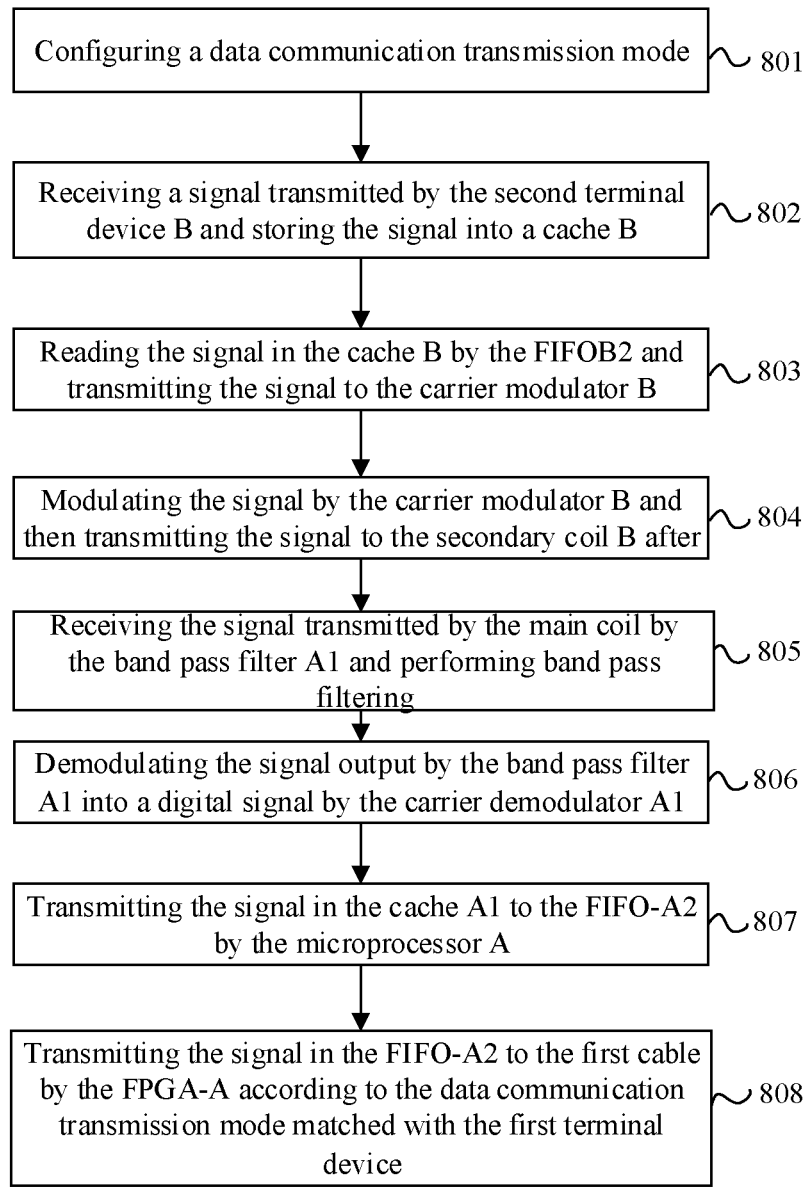
FIG. 8 shows another schematic diagram of signal transmission of a contactless connector according to an embodiment of the present application.

In some optional implementation manners of the embodiment, if a signal is transmitted from the second terminal device B4 to the first terminal device 3, the signal transmission process of the contactless connector of the implementation manner is as shown in FIG. 8 by combining with the above circuit principle diagram.

Step 801: a data communication transmission mode is configured. The specific process is similar to the above step 701, which will be not elaborated herein.

Step 802: a signal transmitted by the second terminal device B is received and stored into a cache B.

Specifically, the FPGA-B receives the signal transmitted by the second terminal device B4 according to the data communication transmission mode and stores the signal into the cache B.

Step 803: the FIFO-B2 reads the signal in the cache B and transmits the signal to the carrier modulator B.

Specifically, the microprocessor B283 may determine whether a storage space of the FIFO-B2 is full. If the storage space is full, the signal is not read so as to be stored in the cache B first; and if the storage space is not full, the signal in the cache B may be read by the FIFO-B2 and stored in the FIFO-B2.

The microprocessor B283 may also determine whether a storage space of the FIFO-B2 is empty. If the storage space is empty, it indicates that there is no signal in the FIFO-B2 and it is necessary to wait for the signal in the FIFO-B2 before continuous processing; and if the FIFO-B2 is not empty, it indicates that a signal is stored and the signal is transmitted to the carrier modulator B284.

Step 804: the signal is modulated by the carrier modulator B and then is transmitted to the secondary coil B after being amplified by the amplifier B.

Specifically, the carrier modulator B284 modulates the signal into a signal on a fb1-fb2 frequency band. It may be understood that for the signal processing circuit C, when the signal of the second terminal device C5 is transmitted to the secondary coil C, a frequency band of the signal is modulated into fc1-fc2. The fc1-fc2, fb1-fb2, fa1-fa2 and fa3-fa4 frequency bands do not overlap mutually, thus facilitating correct transmitting and receiving of the signal and avoiding the problem of false transmission.

Step 805: the band pass filter A1 receives the signal transmitted by the main coil and performs band pass filtering.

Specifically, the band pass filter A1 receives the signal transmitted by the main coil 19 and performs band pass filtering on the signal to acquire a signal on the fb1-fb2 frequency band. Here, fb1-fb2 represents the signal transmitted by the second terminal device B4.

It may be understood that the band pass filter A2 may receive the signal transmitted by the main coil 19 and perform band pass filtering to acquire a signal on the fc1-fc2 frequency band. Here, fc1-fc2 represents the signal transmitted by the second terminal device C5.

step 806: the carrier demodulator A1 demodulates the signal output by the band pass filter A1 into a digital signal and stores the digital signal into a cache A1.

It may be understood that the carrier demodulator A2 demodulates the signal output by the band pass filter A2 into a digital signal and stores the digital signal into a cache A2.

When the contactless connector 1 has a plurality of plug interfaces connected to a plurality of second terminal devices, the number of the carrier demodulators and the band pass filters corresponds to the number of the plug interfaces.

Step 807: the microprocessor A transmits the signal in the cache A1 to the FIFO-A2.

Specifically, the microprocessor A183 may mark the digital signals in the cache A1 and the cache A2 respectively (mark that the digital signals are from the second terminal device B4 or the second terminal device C5), and then package and transmit the digital signals to the FIFO-A2.

Step 808: the FPGA-A transmits the signal in the FIFO-A2 to the first cable according to the data communication transmission mode matched with the first terminal device, and the signal is transmitted to the first terminal device through the first cable.

Specifically, the microprocessor A183 may determine whether the FIFO-A2 is empty. If the FIFO-A2 is not empty, it indicates that there is a signal in the FIFO-A2 and the signal in the FIFO-A2 is transmitted to the FPGA-A, so that the FPGA-A transmits the signal to the first cable 16 according to the data communication transmission mode matched with the first terminal device 3.

If the FIFO-A2 is empty, to avoid missed transmission of the signal, the microprocessor A183 may continuously determine whether there is a signal in the cache A1 and the cache A2 respectively. If there is a signal in the cache A1 and/or the cache A2, the signal is transmitted to the FIFO-A2. If there is no signal in the cache A1, the cache A2 and the FIFO-A2, it indicates that signal transmission is completed.

It may be known from the above implementation manner that the contactless connector of the present application is provided with at least two plug interfaces and can be connected to a plurality of devices through the plug interfaces and plugs matched with the plug interfaces. In special environments such as underwater, desert and the like where there are multiple devices needing to be controlled, the contactless connector of the present application may realize communication between one and multiple devices, thus reducing wiring difficulty and maintenance costs. Furthermore, the contactless connector and the plug are in communication connection through electromagnetic coupling between the main coil and the secondary coil. An electromagnetic coupling transmission signal is a wireless transmission signal. Compared with the wired transmission and wireless transmission modes in the prior art, electromagnetic coupling communication is less interfered by the external environment when the signal is received, and physical plugging and unplugging have little influence on the communication of the contactless connector. Therefore, the contactless connector of the present application has long service life and can have high communication reliability in the special environments such as underwater, desert and the like.

Embodiment II

Figure 9:
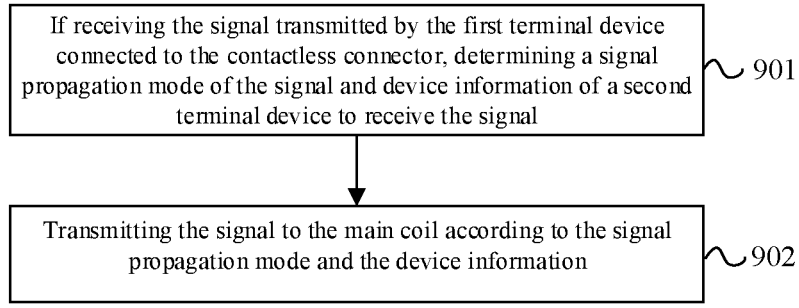
FIG. 9 shows a schematic diagram of a signal processing method for a contactless connector according to an embodiment of the present application.

The embodiment of the invention provides a signal processing method. The signal processing method is applied to the contactless connector in the above embodiment I. As shown in FIG. 9, the signal processing method includes:

step 901: if the signal transmitted by the first terminal device connected to the contactless connector is received, a signal propagation mode of the signal and device information of a second terminal device to receive the signal are determined.

In this embodiment, the contactless connector is connected to the first terminal device. If the signal transmitted by the first terminal device, the contactless connector may analyze the signal.

Specifically, a byte of the signal includes a propagation mode flag and a second terminal device flag. After the contactless connector analyzes the signal, the signal propagation mode may be determined according to a number (such as 0 or 1) of the propagation mode flag of the signal, wherein the signal propagation mode includes a unicast mode or a broadcast mode. The unicast mode, for example, indicates that the signal needs to be transmitted to one of a plurality of second terminal devices; and the broadcast mode, for example, indicates that the signal needs to be transmitted to the plurality of second terminal devices at the same time.

The contactless connector may determine device information of the second terminal device to receive the signal according to device information corresponding to a number (such as a character string consisting of 0 and 1) of the second terminal device flag of the signal or the previous signal.

In some preferred implementation manners of the embodiment, the signal further includes a signal state flag. In this way, after receiving and analyzing the signal, the contactless connector may determine whether the device information is changed according to a number (such as 0 or 1) of the signal state flag.

For example, the contactless connector is connected to the first terminal device, and the contactless connector is provided with three plug interfaces which are respectively connected to three plugs. The three plugs are respectively connected to the second terminal device B, the second terminal device C and the second terminal device D.

Suppose the first terminal device transmits the signal to the second terminal device B and the second terminal device C in a first time period, the first terminal device needs to transmit the signal to the second terminal device C and the second terminal device D in a second time period. In this way, a signal transmission destination changes after the first time period ends. At this time, a number of the state flag of the currently transmitted signal changes (for example, 0 indicates that the signal is transmitted normally and 1 indicates that the destination signal transmission changes). For example, a change from 0 to 1 indicates that the transmission destination of the current signal is different from the previous signal and changes. At this time, it is necessary for the contactless connector to redetermine the device information according to the second terminal device flag of the signal, that is, redetermine the device information of the second terminal device to receive the signal.

If a character of the state flag of the signal is 0, it indicates that the signal is transmitted normally and the transmission destination does not change, that is, the device information of the second terminal device receiving the signal is as same as the device information corresponding to the previous signal of the signal. At this time, the contactless connector does not need to redetermine the device information and only needs to take the device information corresponding to the previous signal as the device information corresponding to the contactless connector, thus reducing the computation quantity of a processor of the contactless connector and improving computation efficiency.

For example, when the contactless connector analyzes the signal, it is divided into the following situations:

if the contactless connector has two plug interfaces and a plug side is connected to the second terminal device B and the second terminal device C:

firstly, the contactless connector determines the propagation mode as a unicast mode or a broadcast mode according to the last bit (signal propagation mode flag).

If the propagation mode is the unicast mode, the contactless connector continuously determines whether the transmission destination of the signal changes compared with the last second bit (state flag) of the signal. If the transmission destination of the signal does not change, the device information corresponding to the previous signal directly serves as the device information of the current signal and is transmitted to the corresponding second terminal device; and if the transmission destination of the signal changes, the next step of determining the device information corresponding to the signal according to the second terminal device flag of the signal is continuously performed.

If the propagation mode is the broadcast mode, the broadcast mode at this time means that it is necessary to transmit the signal to the second terminal device B and the second terminal device C at the same time. If the device information is known, the contactless connector directly modulates the signal into a signal on the corresponding frequency bands of the second terminal device B and the second terminal device C and transmits the signal to the main coil.

If the contactless connector has three or more plug interfaces, for example: three plug interfaces, and plug sides are connected to the second terminal device B, the second terminal device C and a third terminal device D.

If the propagation mode is the unicast mode, the contactless connector continuously determines whether the transmission destination of the signal changes compared with the last second bit (state flag) of the signal. If the transmission destination of the signal does not change, the device information corresponding to the previous signal directly serves as the device information of the current signal and is transmitted to the corresponding second terminal device; and if the transmission destination of the signal changes, the next step of determining the device information corresponding to the signal according to the second terminal device flag of the signal is continuously performed.

If the propagation mode is the broadcast mode, the broadcast mode at this time cannot determine the device information (because there may be the second terminal device B and the second terminal device C to receive the signal, and the second terminal device D does not need to receive the signal). Therefore, the contactless connector needs to determine whether the transmission destination of the signal changes continuously according to the last second bit (state flag) of the signal. If the transmission destination of the signal does not change, the device information corresponding to the previous signal directly serves as the device information of the current signal and is transmitted to the corresponding second terminal device; and if the transmission destination of the signal changes, the next step of determining the device information corresponding to the signal according to the second terminal device flag of the signal is continuously performed.

step 902: the signal is transmitted to the main coil according to the signal propagation mode and the device information.

After the signal propagation mode and the device information are acquired, the contactless connector may transmit the signal to the main coil according to the signal propagation mode and the device information of the second terminal device to receive the signal.

Specifically, if the signal propagation mode is the unicast mode, the contactless connector may modulate the signal into frequency band information matched with the device information and transmit the frequency band information to the main coil. For example, if the signal propagation mode is the unicast mode and the device information of the device receiving the signal represents the second terminal device B, the contactless connector may modulate the signal into a frequency band fa1-fa2 signal and then transmit the frequency band fa1-fa2 signal to the main coil. In this way, the signal on the fa1-fa2 frequency band received and filtered by the plug side represents the signal which is transmitted to the second terminal device B by the first terminal device.

If the signal propagation mode is the broadcast mode, the contactless connector may modulate the signal into a frequency band signal respectively matched with multiple pieces of device information and transmit the frequency band signal to the main coil. For example, the signal propagation mode is the broadcast mode, which means that a plurality of second terminal devices connected to the plug side need to receive the signal. Suppose there are the second terminal device B and the second terminal device C on the plug side, the contactless connector may respectively modulate the signal into signals on the "fa1-fa2" and "fa3-fa4" frequency bands and transmit the signals to the main coil.

Figure 10:
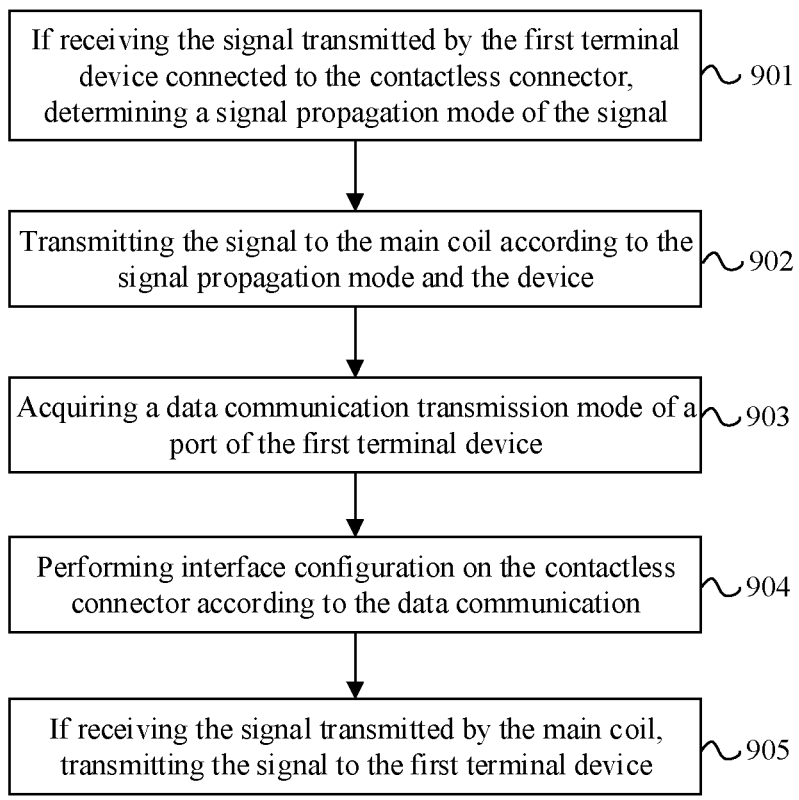
FIG. 10 shows another schematic diagram of a signal processing method for a contactless connector according to an embodiment of the present application.

In some optional implementation manners of the embodiment, as shown in FIG. 10, the signal processing method further includes:

step 903: a data communication transmission mode of a port of the first terminal device is acquired.

Specifically, after being connected to the first terminal device, the contactless connector may acquire the data communication transmission mode of the port of the first terminal device. For example, the data communication transmission mode of the port of the first terminal device may be transmission protocols such as URAT, IIC, SPI, CAN and the like.

step 904: the contactless connector is subjected to interface configuration according to the data communication transmission mode.

The contactless connector may perform interface configuration according to the data communication transmission mode of the port of the first terminal device. Specifically, when the data communication transmission mode is URAT, the contactless connector may respectively configure three of the four leads as TX, RX and GND, and the remaining one is idle; when the data communication transmission mode is IIC, two of the four leads are respectively configured as SCL and SDA, and the remaining two leads are idle; when the data communication transmission mode is SPI, the four leads are respectively configured as CS, SCK, MISO and MOSI; and when the data communication transmission mode is CAN, three of the four leads are respectively configured as CAN_H, CAN_L and GND, and the remaining one is idle.

Step 905: if the signal transmitted by the main coil is received, the signal is transmitted to the first terminal device according to the data communication transmission mode.

If the signal transmitted by the main coil is received, the contactless connector may transmit the signal to the first terminal device according to the data communication transmission mode, thus realizing that the first terminal device receives the signal. In this way, the interface configuration of the contactless connector may be adjusted according to the data communication transmission mode of the port of the first terminal device, so that the contactless connector can be flexibly suitable for different data communication transmission modes and has high universality.

According to the signal processing method of the present application, the contactless connector can transmit the signal to the main coil according to the signal propagation mode of the signal and the device information of the second terminal device to receive a signal, that is, information of a signal receiving end (the second terminal device) is automatically identified and the signal is transmitted to the main coil according to the information, thus facilitating information matching between the signal and the second terminal device, realizing signal transmission between one and multiple devices, avoiding signal transmission error and improving communication efficiency.

Embodiment III

The embodiment of the invention provides a signal processing method. The signal processing method is applied to the first terminal device. The first terminal device can be in communication connection to a second terminal device through a contactless connector and a plug. The contactless connector is, for example, a contactless connector in the embodiment I, which is not limited by this embodiment.

Figure 11:
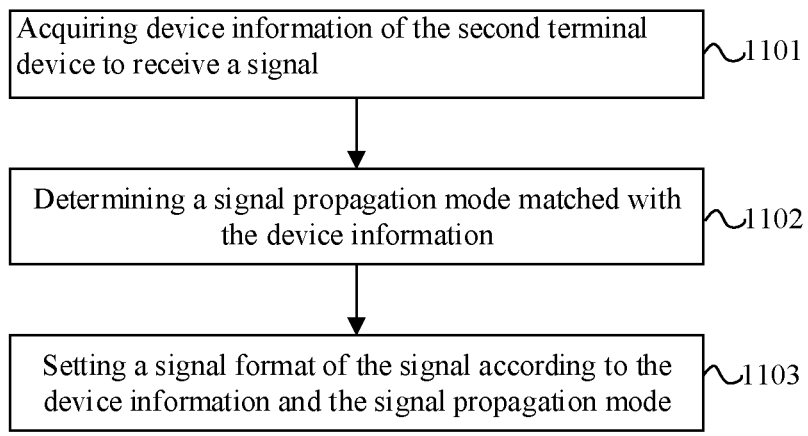
FIG. 11 shows a schematic diagram of a signal processing method for a first terminal device according to an embodiment of the present application.

As shown in FIG. 11, the signal processing method includes:

Step 1101: device information of the second terminal device to receive a signal is acquired.

Here, the first terminal device is configured to transmit a signal to the second terminal device. In this embodiment, a processor of the first terminal device may acquire the device information of the second terminal device to receive a signal through a control instruction input by a user, and may also acquire the device information by other modes, which is not limited by this embodiment. The device information is, for example, identification information representing the second terminal device.

Step 1102: a signal propagation mode matched with the device information is determined.

If it is necessary to transmit the signal to a plurality of second terminal devices at the same time, such as a second terminal device B and a second terminal device C, the first terminal device may determine the signal propagation mode as a broadcast mode.

If it is only necessary to transmit the signal to one of the second terminal devices, the first terminal device may determine the signal propagation mode as a unicast mode.

step 1103: a signal format of the signal is set according to the device information and the signal propagation mode.

Specifically, if the first terminal device learns the device information and the signal propagation mode, the signal format of the signal may be set by combining with the device information and the signal propagation mode.

For example, the first terminal device may set the last bit of the signal as a signal propagation mode flag, wherein 0 represents a unicast mode and 1 represents a broadcast mode. That is, the first terminal device determines the signal as the broadcast mode, the last bit of the signal is set as 1; and if the first terminal device determines the signal as the unicast mode, the last bit of the signal is set as 0.

If the first terminal device determines the device information of the second terminal device to receive the signal, one or more bits of the signal may represent the device information corresponding to the signal. For example, the device information corresponding to the signal may be identified by the last third bit or the last third and fourth bits of the signal.

As an example, if the contactless connector is connected to the second terminal device B and the second terminal device C, the first terminal device may set the last third bit of the signal as a second terminal device flag, for example, 0 represents the second terminal device B and 1 represents the second terminal device C at the last third bit of the signal. If the first terminal device only needs to transmit a signal to the second terminal device B, the first terminal device may set the last third bit of the signal as 0, so that the contactless connector learns that it is necessary to transmit the signal to the second terminal device B.

Since the contactless connector may have three or more plug interfaces, a plug side is connected to a plurality of second terminal devices. To correctly transmit the signal, in some preferred implementation manners of the embodiment, the first terminal device may determine a bit number of the second terminal device flag according to the number of the second terminal devices.

For example, the contactless connector has three plug interfaces, and the plug side is connected to a second terminal device B, a second terminal device C and a second terminal device D.

There are seven combination forms of receiving the signal on the plug side: the second terminal device B receives the signal, the second terminal device C receives the signal, the second terminal device D receives the signal, the second terminal device B and the second terminal device C receive the signal, the second terminal device C and the second terminal device D receive the signal, the second terminal device B and the second terminal device D receive the signal, and the second terminal B, the second terminal device C and the second terminal device D receive the signal.

Therefore, if the combination forms M=7 are determined according to the number of the second terminal devices N=4, the bit number of the second terminal device flag may be that n=3 ($2^n \geq M$). That is, the first terminal device may take the last third, fourth and fifth bits of the signal as the second terminal device flag. As an example, if the three bits are "100", it may indicate that the second terminal device B receives the signal; "010" indicates that the second terminal device C receives the signal; "001" indicates that the second terminal device D receives the signal; "110" indicates that the second terminal device B and the second terminal device C receive the signal; "011" indicates that the second terminal device C and the second terminal device D receive the signal; "101" indicates that the second terminal device B and the second terminal device D receive the signal; and "111" indicates that the second terminal B, the second terminal device C and the second terminal device D receive the signal.

In the process of transmitting the signal by the first terminal device, signals are continuously transmitted to the second terminal device B and the second terminal device D in a certain time period and then it is necessary to transmit the signals to the second terminal device C and the second terminal device D; therefore, to avoid low signal transmission rate caused by that each of signals needs to determine the device information from the second terminal device flag after the contactless connector receives the signals, in some preferred implementation manners of the embodiment, the first terminal device may also set a state flag for the signal.

Specifically, if the device information corresponding to the signal changes compared with the device information corresponding to the previous signal, the first terminal device updates the state flag of the signal. As an example, the signal A to the signal D need to be transmitted to the second terminal device B and the second terminal device D within in the first time period, but the signal e needs to be transmitted to the second terminal device C and the second terminal device D at the beginning of the second time period, then at this time, the first terminal device may update the state flag (for example, the last second bit of the signal e represents the state flag, wherein 0 represents that the signal is transmitted normally and 1 represents that the signal transmission destination changes) of the signal e from 0 to 1, so as to remind the contactless connector continuously identifying the second terminal device flag to determine the device information when identifying that the state flag of the signal is 1. When the signal f is transmitted after the signal e, if the second terminal device C and the second terminal device D receive the signal f, it indicates that the current signal f is as same as the receiving terminal device of the previous signal e, the first terminal device may record the state flag of the signal f as 0 at this time, so as to remind the contactless connector directly using the device information of the previous signal e of the signal f without continuously identifying the second terminal device flag of the signal f to determine the device information, thus saving the computation quantity and improving the signal transmission efficiency.

According to the signal processing method of the embodiment, the first terminal device can set a signal format of the signal according to the device information of the second terminal device and the signal propagation mode matched with the device information, so that when a signal is transmitted to the contactless connector at each time, the signal received by the contactless connector is a signal with the signal format, and the contactless connector may learn the signal propagation mode of the signal and the device information of the second terminal device. It can be seen that the setting of the signal format makes the destination and the propagation mode of the signal in the transmission process clear and specific, so that during communication between one and multiple devices, different signals or the same signal may be transmitted between one and multiple devices at the same time, thereby avoiding communication error while improving signal transmission efficiency.

Figure 12:
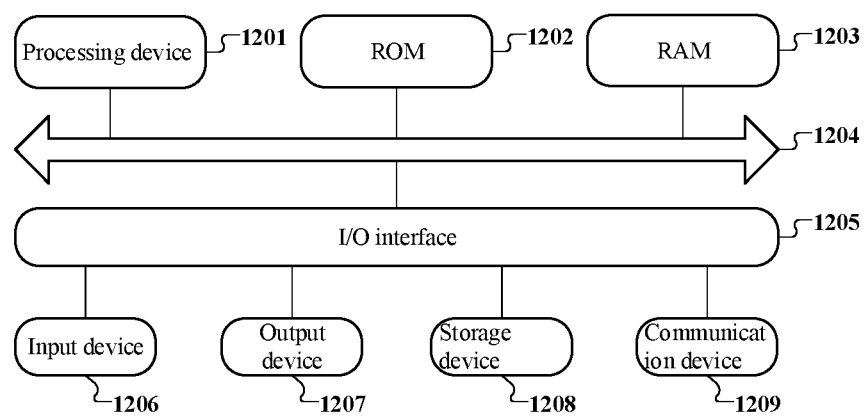
FIG. 12 is a schematic structural diagram suitable for implementing a first terminal device according to an embodiment of the present application.

Referring to FIG. 12, it shows a schematic structural diagram suitable for implementing the first terminal device according to the embodiment of the present application. The first terminal device as shown in FIG. 12 is only an example and should not bring any limitation to the functions and application scope of the embodiment of the present application.

As shown in FIG. 12, the first terminal device may include a processing device (such as a central processing unit, a graphics processing unit and the like) 1201, and the processing device may execute various kinds of appropriate action and processing according to a program stored in a read-only memory (ROM) 1202 or a program loaded to a random access memory (RAM) 1203 from a storage device 1208. Various programs and signals required for operation of a controller are stored in the RAM 1203. The processing device 1201, the ROM 1202 and the RAM 1203 are mutually connected through a bus 1204. An input/output (I/O) interface 1205 is also connected to the bus 1204.

Generally, the following devices may be connected to the I/O interface 1205: including an input device 1206 such as a touch screen, a touch panel, a keyboard, a mouse, a camera, a microphone, an accelerometer, a gyroscope and the like; including an output device 1207 such as a liquid crystal display (LCD), a loudspeaker, a vibrator and the like; including a storage device 1208 such as a magnetic tape, a hard disk and the like; and a communication device 1209. The communication device 1209 may allow the controller and other devices to perform wireless or wired communication to exchange the signal. FIG. 12 shows the controller with various devices, but it should be understood that it is unnecessary to implement or have all the shown devices. It may alternatively implement or have more or less devices. Each square frame shown in FIG. 12 may represent one device, and may also represent a plurality of devices according to requirements.

In particular, according to the embodiment of the present application, the process described above with reference to the flowchart may be implemented as a computer software program. For example, the embodiment of the present application includes a computer program product, including a computer program loaded on a computer readable medium. The computer program includes a program code for performing a method shown in the flowchart. In this embodiment, the computer program may be downloaded and installed from a network through the communication device 1209, or be installed from the storage device 1208, or be installed from the ROM 1202. When the computer program is executed by the processing device 1201, the above function limited in the method of the embodiment of the present application is performed.

It should be noted that the computer readable medium according to the embodiment of the present application may be a computer readable signal medium or a computer readable storage medium or any combination of the two. The computer readable storage medium, for example, may be, but not limited to, electric, magnetic, optical, electromagnetic, infrared or semiconductor system, device or apparatus, or combination of the above. A more specific example of the computer readable storage medium may include, but is not limited to, electric connection with one or more leads, a portable computer disk, a hard disk, a random access memory (RAM), a read-only memory (ROM), an erasable programmable read-only memory (EPROM or flash memory), an optical storage device, a magnetic storage device, or any appropriate combination of the above.

In the embodiment of the present application, a computer readable storage medium may be any tangible medium including or storing a program, and the program may be used by or in combination with an instruction execution system, device or apparatus. However, in the embodiment of the present application, the computer readable signal medium may include a signal propagated in a base band or as a part of carrier wave, and a computer readable program code is carried in the computer readable signal medium. The propagated signal may adopt various forms, including but not limited to an electromagnetic signal, an optical signal or any appropriate combination of the above. The computer readable signal medium may further be any computer readable medium other than the computer readable storage medium. The computer readable signal medium may send, propagate or transmit the program which is used by or in combination with the instruction execution system, device or apparatus. The program code included in the computer readable medium may be transmitted by any appropriate medium, including but not limited to: an electric wire, an optical cable, radio frequency (RF) and the like, or any appropriate combination of the above.

The above computer readable medium may be included in the above first terminal device, and may also be present singly and is not assembled in a server. The above computer readable medium carries one or more programs. When the above one or more programs are executed by the first terminal device, the first terminal devices: acquires device information of the second terminal device to receive a signal, wherein the first terminal device is configured to transmit the signal to the second terminal device; determines a signal propagation mode matched with the device information; and set a signal format of the signal according to the device information and the signal propagation mode.

A computer program code for performing operation of the embodiment of the present application may be written by one or more program design languages or their combination. The program design language includes an object-oriented program design language, such as Java, Smalltalk and C++, and further includes a conventional procedural program design language, such as "C" language or similar program design language. The program code may be completely executed on a user computer, be partially executed on the user computer, be executed as an independent soft package, be executed partially on the user computer and partially on a remote computer, or be completely executed on the remote computer or a server. In the situation involving the remote computer, the remote computer may be connected to the user computer through any types of networks, including a local area network (LAN) or a wide area network (WAN), or may be connected to an external computer (for example, connected through the Internet by an Internet service provider).

The above description is only an explanation of preferred embodiments of the present application and the applied technical principles. It should be understood by those skilled in the art that the inventive scope of the embodiment of the invention is not limited to the technical solutions formed by the particular combinations of the above-mentioned technical features and should also cover other technical solutions formed by any combinations of the above-mentioned technical features or equivalent features thereof without departing from the concept of the invention, for example, the technical solutions formed by interchanging the above-mentioned features with the technical features with similar functions disclosed (but not limited to) in the embodiment of the present application.

The invention claimed is:

1. A contactless connector, capable of being in communication connection to a plug matched with the contactless connector, the plug being provided with a second magnetic core and a second coil spirally arranged at the periphery of the second magnetic core and forming a secondary coil with the second magnetic core, wherein the contactless connector comprises:
   at least two plug interfaces, each of the plug interfaces comprising a first magnetic core;
   a first coil, spirally arranged at an inner periphery of the first magnetic core of each of the plug interfaces and forming a main coil with the first magnetic core; and
   when the contactless connector and a plurality of plugs are connected through the at least two plug interfaces, the main coil and the secondary coil are electromagnetically coupled to realize communication connection between the contactless connector and the plurality of plugs;
   further comprising a signal processing circuit, the signal processing circuit comprising a cable, a port processing unit and a signal processing unit,
   the cable, one end of which can be connected to a first terminal device and the other end can be connected to the port processing unit, is configured to receive a signal transmitted by the first terminal device and/or transmit a signal to the first terminal device;
   the port processing unit, one end of which is connected to the cable and the other end is connected to the signal processing unit, is configured to acquire a data communication transmission mode of a port of the first terminal device and perform interface configuration on the cable according to the data communication transmission mode; and
   the signal processing unit, which is connected to the main coil, is configured to, if receiving the signal transmitted by the first terminal device, transmit the signal to the main coil, and/or is configured to, if receiving the signal transmitted by the main coil, transmit the signal to the first terminal device according to the data communication transmission mode;
   the signal processing unit is further configured to, if receiving the signal transmitted by the first terminal device, determine a signal propagation mode and device information of a second terminal device to receive a signal according to the signal and transmit the signal to the main coil according to the signal propagation mode and the device information,
   the signal propagation mode being an unicast mode or a broadcast mode, and the second terminal device being connected to the contactless connector by the plug;
   the signal processing unit comprises: a carrier modulator, one end of the carrier modulator being connected to the port processing unit and the other end of the carrier modulator being connected to the main coil;
   the carrier modulator is configured to, if the signal propagation mode is a unicast mode, modulate the signal into a frequency band signal matched with the device information and transmit the frequency band signal to the main coil; and/or the carrier modulator is configured to, if the signal propagation mode is a broadcast mode, modulate the signal into frequency band signals respectively matched with multiple pieces of device information and transmit the frequency band signals to the main coil.

2. The contactless connector according to claim 1, wherein the signal processing unit determines the signal propagation mode according to a propagation mode flag of the signal and determines the device information according to a second terminal device flat bit of the signal or device information corresponding to the previous signal.

3. The contactless connector according to claim 2, wherein one of the plug interface of the contactless connector and the plug matched with the plug interface is provided with a connecting piece, and the other one is provided with a matching piece; and
   the matching piece is matched with the connecting piece to realize connection between the plug and the contactless connector.

4. The contactless connector according to claim 1, wherein the signal processing unit further comprises: a plurality of groups of band pass filters and carrier demodulators, the number of the band pass filters and the carrier demodulators is matched with the number of the plug interfaces of the contactless connector;
   the band pass filters, input ends of which are connected to the main coil, are configured to receive the signal transmitted by the main coil; and
   the carrier demodulators, input ends of which are connected to output ends of the band pass filters, are configured to receive signals output by the band pass filters and demodulate the signals into digital signals.

5. The contactless connector according to claim 4, wherein one of the plug interface of the contactless connector and the plug matched with the plug interface is provided with a connecting piece, and the other one is provided with a matching piece; and
   the matching piece is matched with the connecting piece to realize connection between the plug and the contactless connector.

6. The contactless connector according to claim 1, wherein one of the plug interface of the contactless connector and the plug matched with the plug interface is provided with a connecting piece, and the other one is provided with a matching piece; and
   the matching piece is matched with the connecting piece to realize connection between the plug and the contactless connector.

7. A signal processing method, applied to the contactless connector according to claim 1, the method comprising:
   if receiving the signal transmitted by the first terminal device connected to the contactless connector, determining a signal propagation mode of the signal and device information of a second terminal device to receive a signal, wherein the second terminal device is connected to the contactless connector through the plug; and
   transmitting the signal to the main coil according to the signal propagation mode and the device information, wherein the signal propagation mode is a unicast mode or a broadcast mode.

8. The signal processing method according to claim 7, wherein the determining a signal propagation mode of the signal and device information of a second terminal device to receive a signal specifically comprises:
   determining the signal propagation mode according to a propagation mode flag of the signal;

and determining the device information according to a second terminal device flat bit of the signal or device information corresponding to the previous signal.

9. The signal processing method according to claim 8, wherein the determining the device information according to a second terminal device flat bit of the signal or device information corresponding to the previous signal specifically comprises:
   determining whether the device information is changed according to a state flag of the signal;
   if the device information is changed, determining the device information according to the second terminal device flat bit of the signal; and
   if the device information is not changed, taking the device information corresponding to the previous signal as device information corresponding to the current signal.

10. The signal processing method according to claim 9, further comprising:
    acquiring a data communication transmission mode of a port of the first terminal device;
    performing interface configuration on the contactless connector according to the data communication transmission mode;
    and if receiving the signal transmitted by the main coil, transmitting the signal to the first terminal device according to the data communication transmission mode.

11. The signal processing method according to claim 8, further comprising:
    acquiring a data communication transmission mode of a port of the first terminal device;
    performing interface configuration on the contactless connector according to the data communication transmission mode;
    and if receiving the signal transmitted by the main coil, transmitting the signal to the first terminal device according to the data communication transmission mode.

12. The signal processing method according to claim 7, wherein the transmitting the signal to the main coil according to the signal propagation mode and the device information specifically comprises:
    if the signal propagation mode is a unicast mode, modulating the signal into a frequency band signal matched with the device information and transmitting the frequency band signal to the main coil; and/or
    if the signal propagation mode is a broadcast mode, modulating the signal into frequency band signals respectively matched with multiple pieces of the device information and transmitting the frequency band signals to the main coil.

13. The signal processing method according to claim 12, further comprising:
    acquiring a data communication transmission mode of a port of the first terminal device;
    performing interface configuration on the contactless connector according to the data communication transmission mode;
    and if receiving the signal transmitted by the main coil, transmitting the signal to the first terminal device according to the data communication transmission mode.

14. The signal processing method according to claim 7, further comprising:
    acquiring a data communication transmission mode of a port of the first terminal device;
    performing interface configuration on the contactless connector according to the data communication transmission mode;
    and if receiving the signal transmitted by the main coil, transmitting the signal to the first terminal device according to the data communication transmission mode.

15. A signal processing method, applied to a first terminal device, the first terminal device being in communication connection to a second terminal device through the contactless connector, the method comprising:
    acquiring device information of the second terminal device to receive a signal, wherein the first terminal device is configured to transmit the signal to the second terminal device;
    determining a signal propagation mode matched with the device information; and
    setting a signal format according to the device information and the signal propagation mode;
    the signal format further comprises a state flag, and the method further comprises:
    updating the state flat bit in response to a change of the device information.

16. The signal processing method according to claim 15, wherein the signal format comprises a propagation mode flag and a second terminal device flag, and the method further comprises:
    determining a bit number of the second terminal device flat bit according to the number of the second terminal devices.

* * * * *